(12) United States Patent
Cha

(10) Patent No.: US 6,788,962 B2
(45) Date of Patent: Sep. 7, 2004

(54) METHOD OF ENHACNING KEY FUNCTIONS IN MOBILE TELECOMMUNICATION TERMINAL

(75) Inventor: Jae-Min Cha, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 469 days.

(21) Appl. No.: 09/752,621

(22) Filed: Dec. 28, 2000

(65) Prior Publication Data

US 2001/0006904 A1 Jul. 5, 2001

(30) Foreign Application Priority Data

Dec. 31, 1999 (KR) .......................................... 99-68271

(51) Int. Cl.[7] .................................................. H04B 1/38
(52) U.S. Cl. .................... 455/566; 455/556.1; 345/171; 345/172; 379/368
(58) Field of Search ........................... 455/556.1, 556.2, 455/575.1, 566, 90.1; 345/160, 169, 170, 171, 173, 182, 172; 379/368, 433.07, 433.06

(56) References Cited

U.S. PATENT DOCUMENTS

| | | | | |
|---|---|---|---|---|
| 5,945,928 A | * | 8/1999 | Kushler et al. | 341/28 |
| 5,946,376 A | * | 8/1999 | Cistulli | 379/88.06 |
| 6,131,048 A | * | 10/2000 | Sudo et al. | 455/566 |
| 6,351,657 B2 | * | 2/2002 | Yamada | 455/566 |
| 6,356,258 B1 | * | 3/2002 | Kato et al. | 345/168 |
| 6,405,060 B1 | * | 6/2002 | Schroeder et al. | 455/566 |
| 6,487,424 B1 | * | 11/2002 | Kraft et al. | 455/566 |
| 6,507,336 B1 | * | 1/2003 | Lunsford | 345/168 |
| 6,539,243 B1 | * | 3/2003 | Kimura et al. | 455/550.1 |
| 6,600,919 B1 | * | 7/2003 | Kawase | 455/418 |
| 2001/0009862 A1 | * | 7/2001 | Nonami | 455/566 |

OTHER PUBLICATIONS

Japanese Office Action dated Nov. 4, 2003 issued in a counterpart application, namley, Appln. No. 2000–389502.
N501i Hyper, NTTDoCo MO, 1999, pp. 13, 14, 53, 54, 57, 58, 253, 254.

\* cited by examiner

*Primary Examiner*—William Trost
*Assistant Examiner*—Sharad Rampuria
(74) *Attorney, Agent, or Firm*—Dilworth & Barrese LLP

(57) ABSTRACT

Disclosed is a method of enhancing key functions in a mobile telecommunication terminal, and particularly a method of enhancing key functions in a key input section by having at least one or more separate keys. The method according to the invention includes the steps of confirming the kind of a special functional key, if inputted, waiting for an input of the key in the key input section if the inputted special functional key is a key for performing a separate function corresponding to the key in the key input section, and performing a function of the table corresponding to the key of the key input section, if inputted. The method further comprises the steps of displaying a demand for reversal of a state if the inputted special functional key demands a shift of the state between English capital letter mode and English small letter mode, performing a key function in accordance with the reversal of the state, detecting whether or not the input of the special functional key demands a shift of language mode settable in a key input mode, and if so, shifting the current language mode to a next settable language mode. The method further comprises the steps of displaying a selection of an Internet symbol mode if the demand for an input of the functional key corresponds to a demand for an input of the symbols, and displaying a symbol corresponding to the key corresponding to the key input section if the key corresponding to the key input section is inputted.

6 Claims, 4 Drawing Sheets

METHOD OF ENHACNING KEY FUNCTIONS IN MOBILE TELECOMMUNICATION TERMINAL

PRIORITY

This application claims priority to an application entitled "Method of Enhancing Key Functions in Mobile Telecommunication Terminal" filed with the Korean Industrial Property Office on Dec. 31, 1999 and assigned Serial No. 99-68271, the contents of which is hereby incorporated by reference.

BACKGROUND OF THE INVENTION

1. Field of the Invention

The present invention relates to a method of enhancing key functions in a mobile telecommunication terminal, and in particular, to a method of enhancing functions of a key for diverse purposes.

2. Description of the Related Art

A mobile telecommunication terminal is a wireless device, through which a user can telecommunicate via voice and data while moving from location to location. Though being able to satisfy voice telecommunications utilizing only numeric keys, such a mobile telecommunication terminal has a problem in data telecommunications in that a great number of numeric keys need to be inputted. Because of the inherent limitation in size of the terminal that is required to satisfy the portability feature of the mobile telecommunication terminal, the number of keys is also limited. Increasing the number of keys necessitates magnification of the size of the mobile telecommunication terminal. On the other hand, reducing the size of the keys also poses a problem in that the user can hardly push the keys.

Under the present circumstances, key inputs are now conducted in the manner of selecting diverse modes such as a Korean language input mode, English language input modes in capital letters and in small letters, a diverse symbols input mode, etc. Setting any one of the above modes enables the user to express desired data. However, this method also has a drawback of requiring a great number of key inputs. Especially when access to Internet web sites through a mobile telecommunication terminal is desired, diverse kinds of keys need to be inputted. In that case, it may become mandatory to shift key input modes from English language to Korean language and vice versa. Instead of providing additional keys for symbols, diverse symbols are generally displayed on a liquid crystal display (LCD) panel so that the user can input each symbol by pressing the keys in a particular input order. Unfortunately, this results in an increase of the number of key inputs. Thus, when moving through numerous sites on the Internet, in which a channel must be in continuous use, key input times increase, thereby incurring expensive telecommunication fees.

SUMMARY OF THE INVENTION

It is, therefore, an object of the present invention to provide a method of easily operating inputs of Korean language, English language, symbols or various modes by diversifying key functions with additional keys having particular purposes.

A method of enhancing key functions in a mobile telecommunication terminal including keys having special functions and a table for key input in a key input section corresponding to the keys having special functions comprises the steps of: confirming the kind of key having a special function, if inputted; waiting for a key input in the key input section if the key having a special function performs a separate function corresponding to the key in the key input section; and performing a table function corresponding to the key in the key input section, if inputted.

If the inputted key having a special function demands a shift of letters in the English language modes, the method further comprises the steps of: displaying a demand for shifting the letters on a display section; performing a key function in accordance with the shift of letters; detecting whether or not the input of the key having a special function demands a shift of the language in a key input mode; and shifting the currently set language mode to a next settable language mode, if the detection finds an input of a key demanding a shift of the language mode.

If the demand of an input of the key having a special function pertains to a symbol used on the Internet, the method further comprises the steps of: displaying a selection of the corresponding mode; and displaying the symbol corresponding to the key, if a key corresponding to the key input section is inputted in the selected mode.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
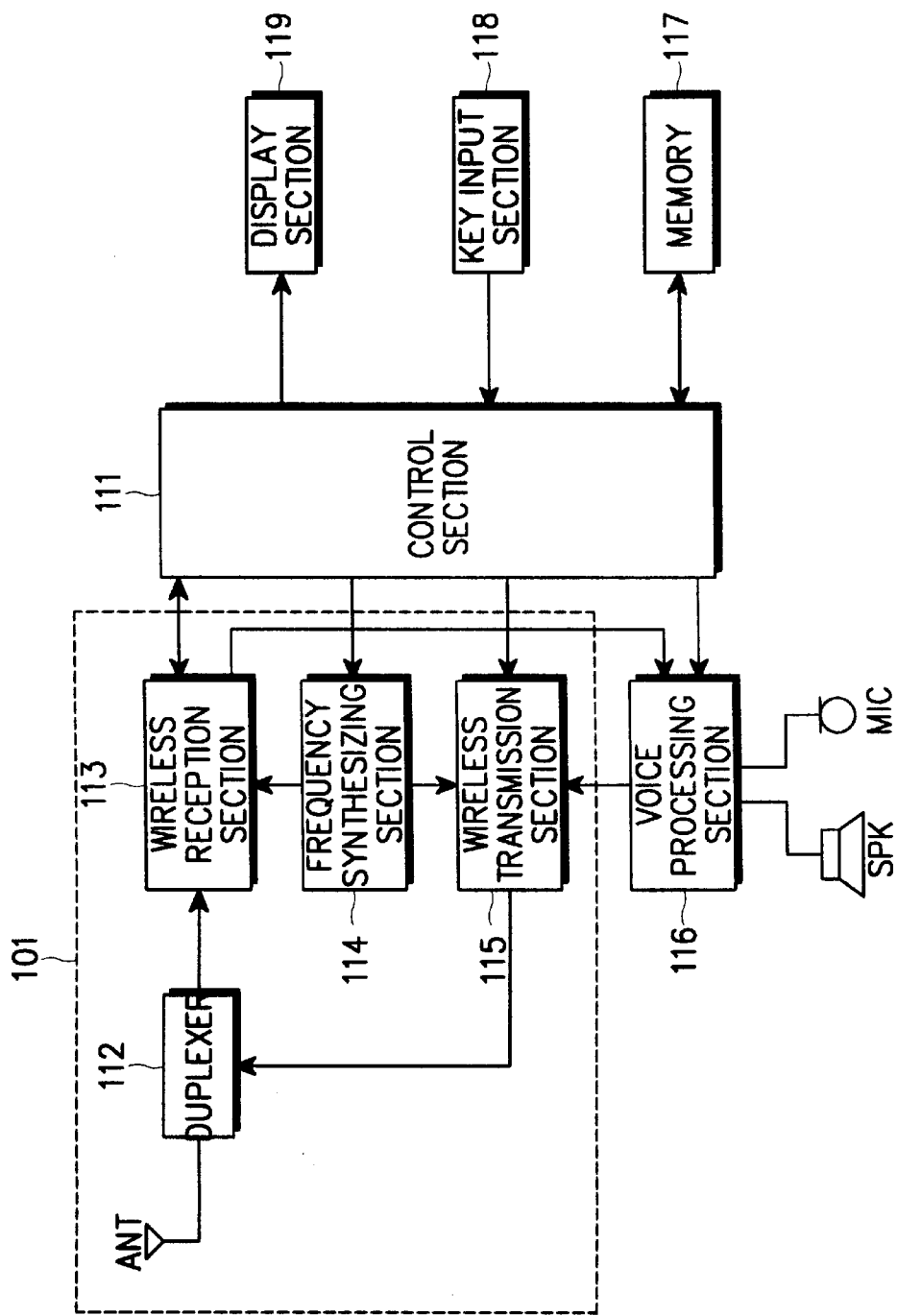
FIG. 1 is a block diagram illustrating a construction of a mobile telecommunication terminal, to which the present invention is applicable.

FIG. 1 is a block diagram illustrating a construction of a mobile telecommunication terminal, to which the present invention is applicable. The construction and an operation of the mobile telecommunication terminal, to which the present invention is applicable, will now be explained in detail with reference to FIG. 1.

A control section 111 controls an overall operation of the mobile telecommunication terminal, and particularly detects a telephone number stored in a memory when dialing, and displays the detected telephone number on a predetermined display means 119. An antenna ANT either transmits wireless signals through a public carrier or receives public carrier signals for output to a duplexer 112. The duplexer 112 transfers the wireless signals received by the antenna ANT to a wireless reception section 113, and transfers the wireless signals received by a wireless transmission section 115 to the public carrier through the antenna ANT. The wireless reception section 113 converts only the signals corresponding to the channel of a frequency bandwidth set by the control section 111 to signals or data of a base bandwidth, and outputs the converted signals or data. The wireless transmission section 115 converts the signals or data of the base bandwidth to those of a frequency to be transmitted under control by the control section 111, and outputs the converted signals or data to the duplexer 112. A frequency synthesizing section 114 generates frequencies to be outputted to the wireless reception section 113 and the wireless transmission section 115 for output of the same. The antenna ANT, the duplexer 112, the wireless reception section 113, the frequency synthesizing section 114, the wireless transmission section 115 are collectively referred to as "wireless section 101."

A voice processing section 116 decodes a coded signal of the base bandwidth received by the wireless reception section 113, and outputs the decoded signals to a speaker SPK. The voice processing section 116 further codes the signals received by a microphone MIC, and outputs the coded signals to the wireless transmission section 115. The speaker SPK outputs the decoded and inputted electric signals in an audible sound. The microphone MIC converts the signals of the audible sound to electric signals, and outputs the converted signals to the voice processing section 116. A memory 117 comprises a region for storing data required for controlling the mobile telecommunication terminal, and a region for temporarily storing the data generated during the control process. The memory 117 further comprises a table in accordance with an operation performed by the mobile telecommunication terminal that matches with a particular key input according to the present invention.

Table 1 below shows such a function performed by a mobile telecommunication terminal in which three keys are pressed to provide input signals according to an embodiment of the present invention.

TABLE 1

| Classification | Shift | ALT | CTRL |
| --- | --- | --- | --- |
| Numeric Keys | English Capital Letters | Shift of English/Korean Modes | Diverse Special Functions |

As illustrated in the Table 1 above, a special function is performed to correspond to each numeric key, if pushed after pushing a control key such as the "SHIFT" key, "ALT" key, or "CTRL" key. The following Table 2 shows an example.

TABLE 2

| NUMERALS | FUNCTIONS |
| --- | --- |
| 1 | Vibration/Bell |
| 2 | Back Light On/Off |
| 3 | Alarm On/Off |
| 4 | Confirmation of the Last Telecommunication Time |
| 5 | Adjustment of the Displaying Intensity in the Display Section |
| 6 | Management of the Mail Box |
| 7 | Confirmation of the Total Telecommunication Time |
| 8 | Display of the First-Set Overseas Time |
| 9 | Display of the Second-Set Overseas Time |
| 0 | Management of the Alarming Time |
| * | Dialing to the Voice Mail Box |
| # | Voice Dialing Mode |

The above Table 2 is merely an example. Therefore, it is possible to construct other functions as well by means of control keys and numeric keys. Although the Table 2 above exemplified pushing a numeric key after pushing a function key, it may be constructed, if necessary, to perform the above operations by simultaneously pushing a function key and a numeric key. The key input section 118 having a key matrix structure generates a key signal corresponding to the key pushed by the user, and outputs the same to the control section 111. Also, the key input section 118 may further comprise one or more particular keys according to the present invention as shown in FIG. 2*a*.

Figure 2A:
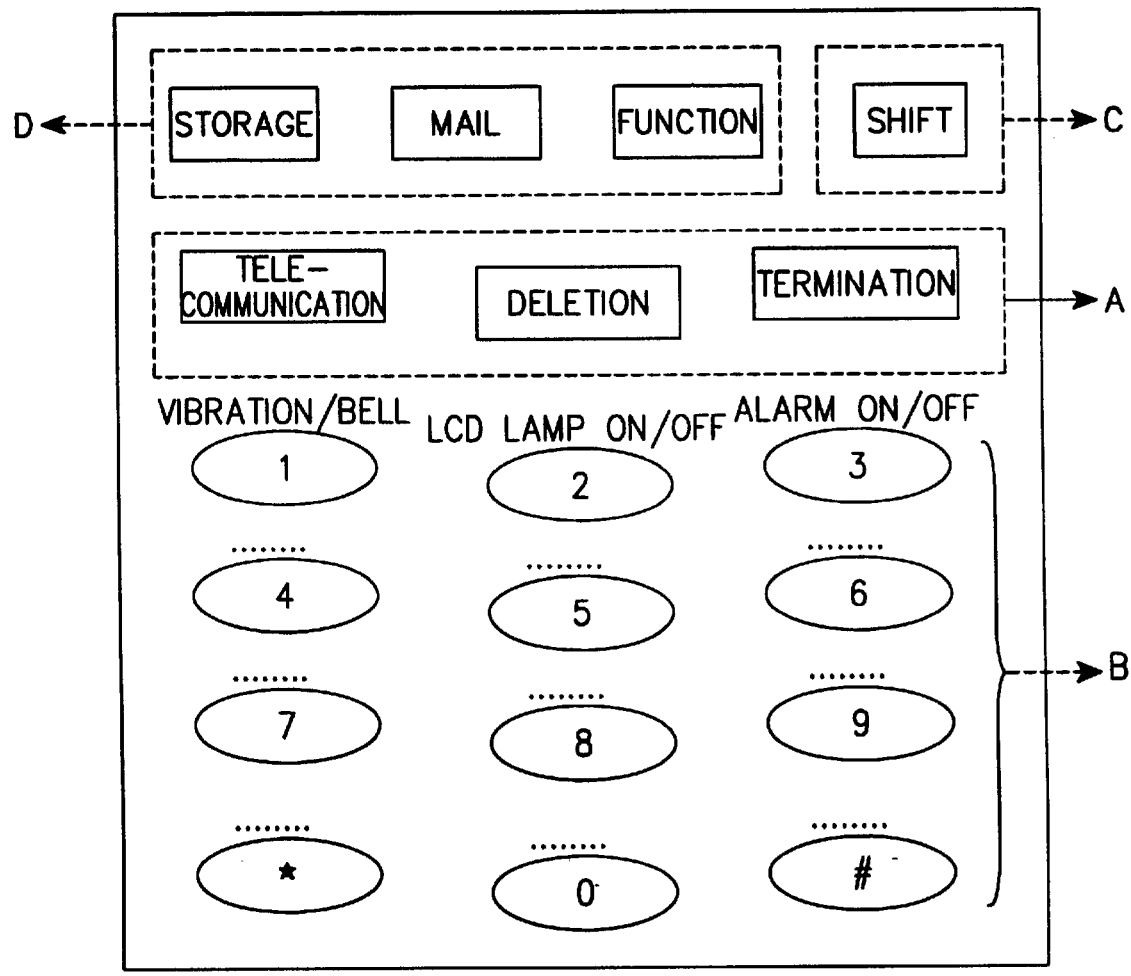
FIG. 2a is a block diagram illustrating a key input section of the mobile telecommunication terminal according to a first embodiment of the present invention.
Figure 2B:
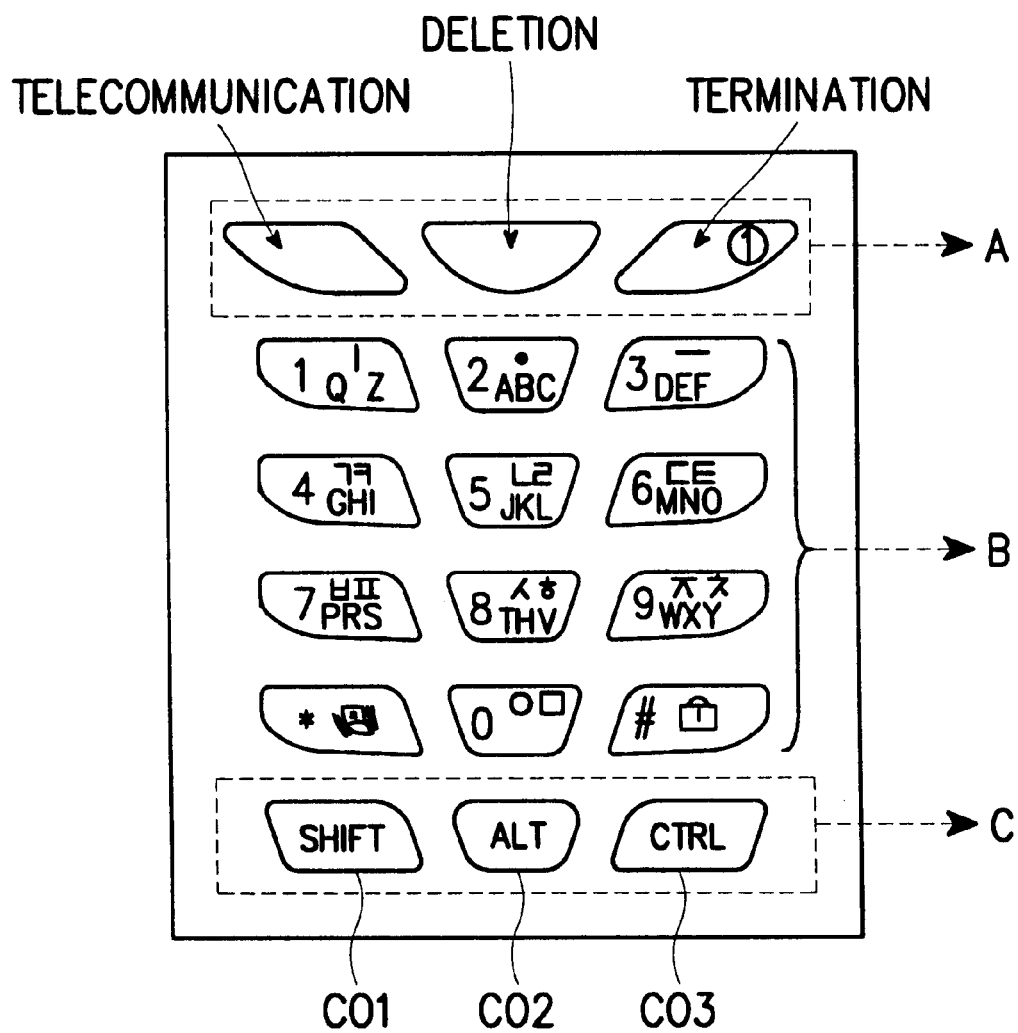
FIG. 2b is a block diagram illustrating a key input section of the mobile telecommunication terminal according to a second embodiment of the present invention.

FIG. 2 (as represented by FIGS. 2A and 2B) is a block diagram illustrating a key input section of the mobile telecommunication terminal according to a first embodiment of the present invention. An operation of the mobile telecommunication terminal according to a first embodiment of the present invention will be described herein below.

The region A in FIG. 2A represents keys used for telecommunication in the mobile telecommunication terminal, comprising a telecommunication key for operations of on-hook and off-hook, and a termination key. The region A further comprises a deletion key for deleting or canceling erroneously inputted numbers. Region B comprises numeric keys consisting of numeric keys for dialing and special keys such as * and #. Each numeric key basically includes Korean characters and English alphabet letters for input in Korean or English language. In the embodiment of the present invention, there is provided the capability of shifting between language modes, specifically Korean and English language modes. It will be apparent to those skilled in the art that the setting of the language modes is not limited to the above two languages.

The indication of each function may be printed on an upper portion of each key, i.e., on the surface pushed by the user, or on an upper or a lower portion of the casing housing a key matrix of the mobile telecommunication terminal which includes the keys. The input of each key exemplified above is an example that is generally used in a mobile telecommunication terminal. The input can be implemented only upon setting a Korean or an English language mode for expression of Korean or English language. The region D is a region comprising functional keys for performing storage or other diverse functions, and can include keys for electronic mail, etc. The region C is a region comprising functional keys according to the present invention. The region C is constituted to operate in the same manner as when the control key is included in the memory 117 as shown in the Table 2 above. This means that the region C is constructed to operate as in the construction of Table 2 above.

A second embodiment of the present invention will now be explained with reference to FIG. 2B. FIG. 2B is a block diagram illustrating a key input section of the mobile telecommunication terminal according to a second embodiment of the present invention. The following is a detailed description of the keys additionally comprised in the key input section of the mobile telecommunication terminal according to the present invention.

Regions A and B in FIG. 2B has the same construction as regions A and B in FIG. 2A, while region D is not shown in FIG. 2B, the second embodiment of the present invention. The functions of the three keys in region C of FIG. 2B may be assigned according to the functions set forth in Table 1. The functions in Table 2 above is realized by means of a control key CO3. For terminals that exist presently in the prior art, the input of diverse languages, such as a Korean language mode, an English language capital letter mode or an English language small letter mode would be selected by pressing separate keys. According to the present invention, however, English capital letters can be inputted once after pushing the "SHIFT" key located in the region C as key CO1. Also, a change of a language mode to Korean or English can be easily performed by pushing the "ALT" key CO2.

In this embodiment, when pushing the "CTRL" key, other special functions of the mobile telecommunication terminal can be performed. Although the second embodiment of the present invention distinguishes the letter modes and a special function mode with three keys, it is also possible to distinguish those modes by comprising more than one key only. In other words, pressing a "SHIFT" key only can serve to distinguishing the capital letter mode from the small letter mode, while pressing an "ALT" key only can serve to distinguish the Korean language mode from the English language mode. Further, pressing a control key "CTRL" only can serve to perform special functions of the mobile telecommunication terminal. It may be constructed to display an input of the "SHIFT" key, if inputted, and to display English capital letters only until the "SHIFT" key is inputted again. Or, it may also be constructed to display English capital letters only after input of the "SHIFT" every time. The same mechanism can be applied to the "ALT" key or the "CTRL" key. The special keys located in region C will be referred to "special functional keys" in the following description to be made with reference to FIG. 1.

Referring to FIG. 1, the display section 119 displays the status and operational process of the mobile telecommunication terminal. When one of the functional keys according to the present invention is inputted, the display section 119 displays such a status, and performs display modes corresponding to input of each functional key.

Figure 3:
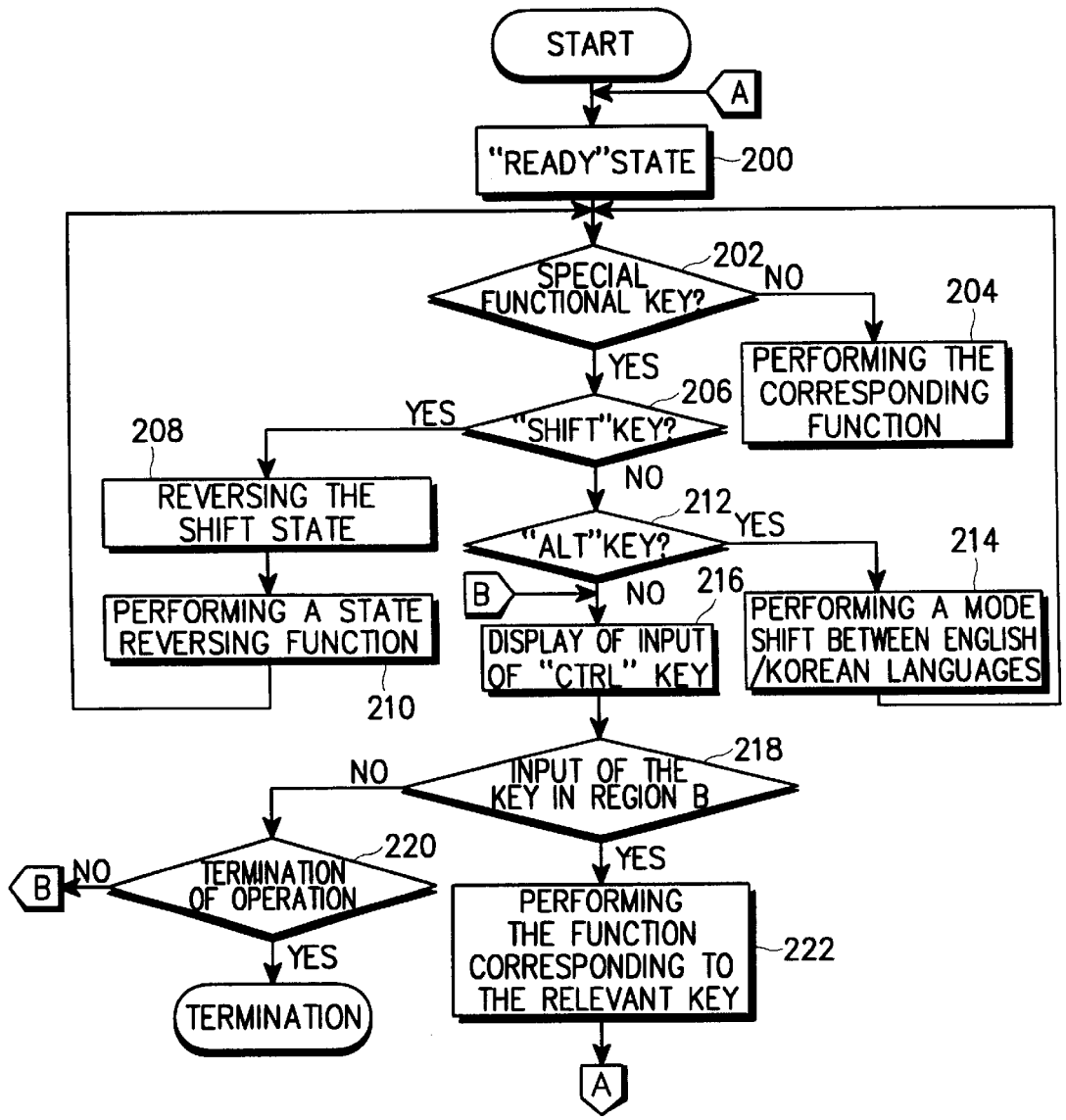
FIG. 3 is a flow chart illustrating a control of an operation for an additional function when a key having a special function is inputted according to a preferred embodiment of the present invention.

FIG. 3 is a flow chart illustrating a control operation for an additional function when a key having a special function is inputted according to a preferred embodiment of the present invention. An operation of the functional keys will now be explained with reference to FIGS. 1 to 3. The process of FIG. 3 will be explained based on the second embodiment in FIG. 2B.

The control section 111 retains the "ready" state in step 200. When any event occurs, the process proceeds to step 202. In step 202, the control section 111 detects whether or not any special functional key is inputted from the key input section 118. If so, the process proceeds to step 206. If not, step 204 is performed, whereby the function of the particular key that was pressed is performed. In step 206, the control section 111 detects whether or not the "SHIFT" key has been inputted. If so, the control section 111 proceeds to step 208. If not, the control section 111 proceeds to step 212. The process of step 208 will first be explained herein below.

In step 208, the control section 111 reverses the "SHIFT" state. To be specific, if the "SHIFT" key has already been inputted, release of the "SHIFT" key is performed. In step 210, the control section 111 displays the reversed state so as to perform an operation in accordance with the reverse state. For instance, when performing the operation as shown in the Table 1 above, the control section 111 controls the shift from the English capital letter mode to the English small letter mode, and vice versa. Following step 210, the process returns to step 202.

By contrast, if the "SHIFT" key was not input at step 206, the control section 111 detects whether or not the "ALT" has been inputted at step 212. If so, the control section 111 proceeds to step 214. If not, the control section 111 proceeds to step 216. Since the present case pertains to the case where a special functional key has been inputted in step 202, no input of the "ALT" key in step 212 means an input of the "CTRL" key, which is then displayed at step 216. In the case of an input of the "ALT" key, a shift of the mode between English and Korean languages is performed at step 214. In other words, if the current mode is a Korean language mode, the mode is shifted to an English language mode, and vice versa. The process then returns to step 202.

When the "CTRL" key has been inputted, the control section 111 displays such a state on the display section 119 at step 216. The control section 111 then proceeds to step 218 to detect whether or not a key input exists in the region B. If so, the control section 111 proceeds to step 222 to perform the operation corresponding to the input key, as shown in the Table 2 above. The process then returns to step 200. If not, the control section 111 proceeds to step 220 to detect whether or not a key signal following termination of the operation has been received. The key signal following termination of the operation pertains to the case when the termination key in the region A is inputted, as shown in FIGS. 2A and 2B, or a flip of the mobile terminal has been closed. If the termination key has been input, the process ends. If not, the process returns to step 216.

Through this process, an effective addition of other functions can be realized without increasing the number of keys in the mobile telecommunication terminal. While FIG. 3 was explained based on the embodiment in FIG. 2B, it is possible to perform operation after proceeding with step 216 in FIG. 3 when the keys are comprised as shown in FIG. 2A. Also, the contents of the Table 1 and Table 2 are various examples of enhancing key functions, which should not be limited thereto. Other variable functions can also be set for performance of telecommunication. Further, although the embodiments of the present invention precluded symbol keys used for internet communication such as "http:\\www." or "@" from the process of special key input process, it is also possible to construct the key input section to input those symbols with a single key.

As described above, the present invention provides advantages of performing telecommunication by providing special functional keys in a mobile telecommunication terminal to perform diverse functions in a mobile telecommunication terminal.

While the invention has been described with reference to a detailed example of the preferred embodiment thereof, it is understood that variations and modifications thereof may be made without departing from the true spirit and the scope of the invention. Therefore, it should be understood that the true spirit and the scope of the invention are not limited by the above embodiment, but defined by the appended claims and equivalents thereof.

What is claimed is:

1. A method of enhancing key functions in a mobile telecommunication terminal including a plurality of special functional keys, a key input section having a plurality of numeric keys and a memory for storing a function table for numeric key input corresponding to selection of one of the plurality of special functional keys, the method comprising the steps of:

confirming the input of one of the plurality of special functional keys, wherein each of the plurality of special functional keys is a key for performing a separate function corresponding to the plurality of numeric keys;

waiting for an input of a numeric key if the inputted special functional key is a key for performing a separate function corresponding to the numeric key; and performing a function of the function table corresponding to the numeric key, if the numeric key was inputted.

2. The method of claim 1, further comprising the steps of:

displaying a demand for reversal of a state if the inputted special functional key demands a shift of the state between an English capital letter mode and an English small letter mode; and performing a key function in accordance with the reversal of the state.

3. The method of claim 1, further comprising the steps of:

detecting whether or not the input of the special functional key demands a shift of a language mode settable in a key input mode; and if so, shifting the current language mode to a next settable language mode.

4. The method of claim 1, further comprising the steps of:

displaying a selection of an Internet symbol mode if the demand for an input of the special functional key corresponds to a demand for an input of the symbols; and displaying a symbol corresponding to the key of the key input section if the key corresponding to the key input section is inputted.

5. The method of claim 3, wherein the plurality of numeric keys include keys numbered 1 through 9 and keys labeled * and #.

6. The method of claim 5, wherein the plurality of numeric keys include keys are labeled with both English alphabet and Korean alphabet characters, to allow input in either Korean or English language according to the shift of the language mode.

* * * * *

UNITED STATES PATENT AND TRADEMARK OFFICE
CERTIFICATE OF CORRECTION

PATENT NO.     : 6,788,962 B2
DATED          : September 7, 2004
INVENTOR(S)    : Jae-Min Cha It is certified that error appears in the above-identified patent and that said Letters Patent is hereby corrected as shown below:

Title page,
Item [54], Title, "METHOD OF ENHANCING KEY FUNCTIONS IN MOBILE TELECOMMUNICATION TERMINAL" should be -- METHOD OF ENHANCING KEY FUNCTIONS IN MOBILE TELECOMMUNICATION TERMINAL --.

Signed and Sealed this

Twenty-sixth Day of October, 2004

JON W. DUDAS
*Director of the United States Patent and Trademark Office*